Figure 1:
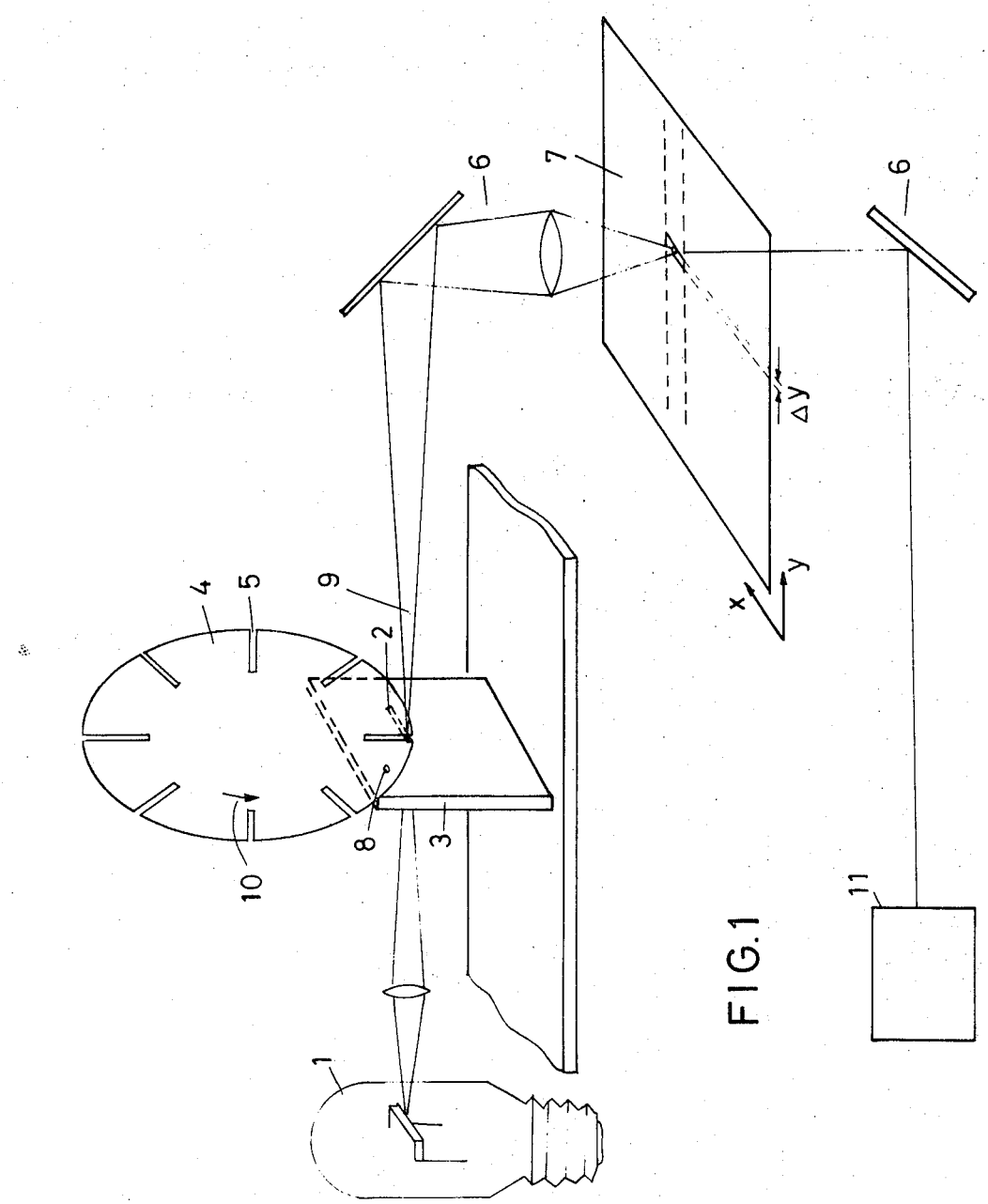

United States Patent [19]
Klimecki

[11] 3,768,913
[45] Oct. 30, 1973

[54] METHOD AND APPARATUS FOR EVALUATION OF THE INTENSITY OF SPOTS

[76] Inventor: Vladimir Klimecki, Lagerlofsgatan 22, Uppsala, Sweden

[22] Filed: Oct. 27, 1971

[21] Appl. No.: 192,813

[30] Foreign Application Priority Data
Nov. 2, 1970  Sweden.............................. 14780/70

[52] U.S. Cl............. 356/203, 250/219 FR, 250/224
[51] Int. Cl...................... G01n 21/06, G01n 21/22
[58] Field of Search.................... 356/203, 202, 102; 250/219 Q, 219 FR, 224

[56] References Cited
UNITED STATES PATENTS
| | | | |
|---|---|---|---|
| 3,578,904 | 5/1971 | Dewey et al. ........................ | 356/102 |
| 3,579,249 | 5/1971 | Dewey et al. ........................ | 356/102 |
| 3,006,238 | 10/1961 | Eberline.............................. | 356/203 |
| 3,471,242 | 10/1969 | Nichols.............................. | 356/202 |
| 3,424,534 | 1/1969 | Miller et al. ........................ | 356/203 |

OTHER PUBLICATIONS
"A Computer-Linked Cathode-Ray Tube Microdensitometer For X-Ray Crystallography;" Arndt et al.; Jour. of Scientific Instruments; 1968 Series 2, Vol. I, pg. 510-516.

Primary Examiner—Ronald L. Wibert
Assistant Examiner—V. P. McGraw
Attorney—S. Delvalle Goldsmith, Lester Horwitz, Aaron M. Sharf, Herbert L. Boethcher, Paul B. West, Iain C. Boillie and Robert Black

[57] ABSTRACT

A method and apparatus to measure the integrated density of spots on photographic films is disclosed. The coordinates of spots of normal density are measured and stored in analog form in an analog memory. Evaluation of the integrated density of weak spots is achieved by borrowing from the memory the coordinates of a previous spot of normal density and using said coordinates as the contour of the weak spot. Existence conditions are given for a spot of normal density.

12 Claims, 19 Drawing Figures

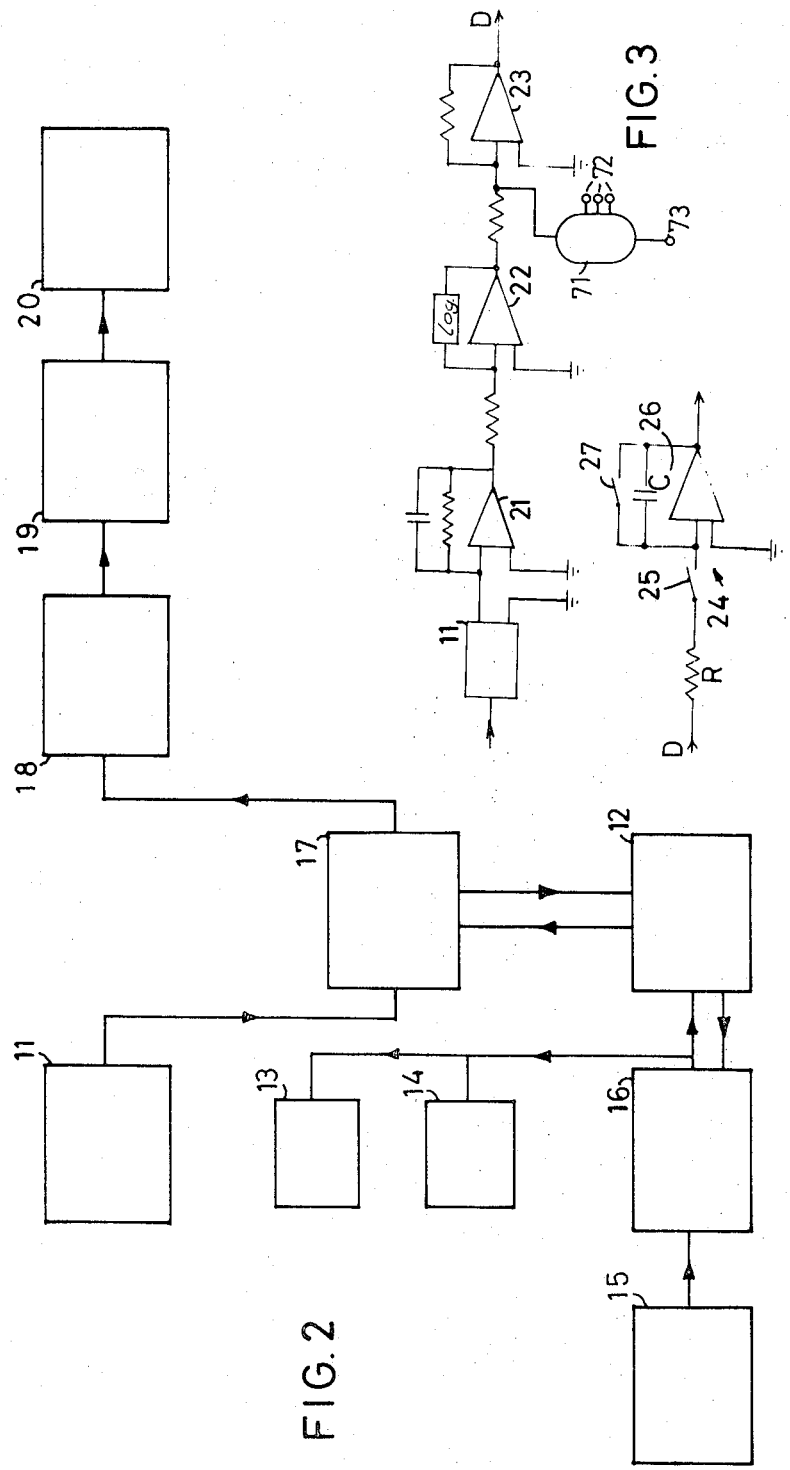

Patented Oct. 30, 1973
3,768,913
6 Sheets-Sheet 3
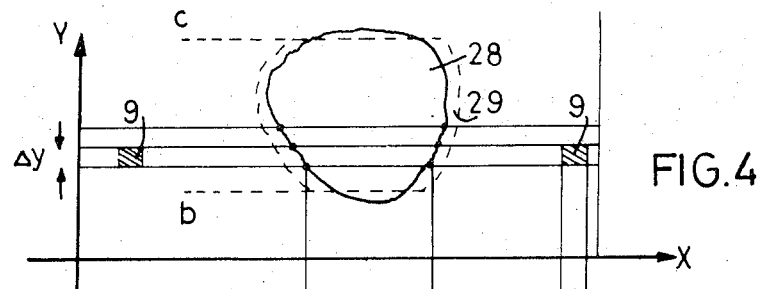
FIG. 4
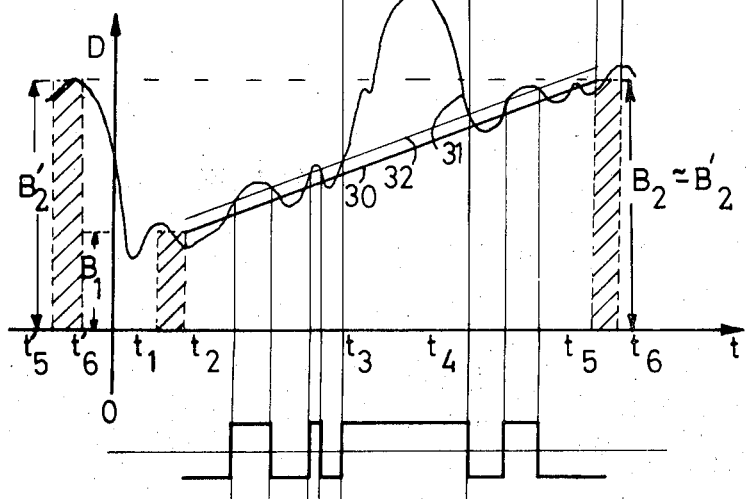
FIG. 5
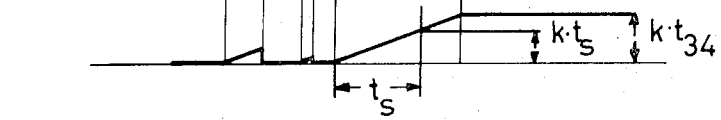
FIG. 5A
FIG. 5B
FIG. 5C
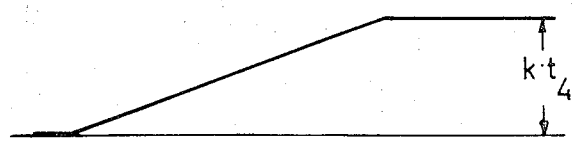
FIG. 5D
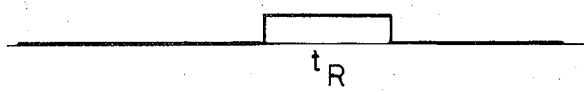
FIG. 5E
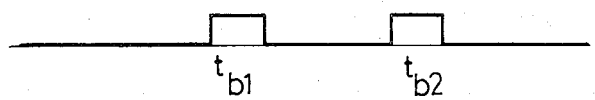
FIG. 5F

METHOD AND APPARATUS FOR EVALUATION OF THE INTENSITY OF SPOTS

The present invention relates to a method and an apparatus to measure the integrated density of spots, particularly faintly blackened spots exposed on photographic film, this method comprising scanning a well defined area of the film with a light beam for measuring and integrating of the optical density values of said area. The invention may advantageously be used in connection with calculation of the integrated density of spots exposed on x-ray photographs.

The density of a spot is generally measured in such a way that the spot is illuminated with a light beam having a predetermined intensity. The amount of light transmitted through the spot is measured for example by a photomultiplier. The ratio of the intensity of the transmitted light and the intensity of the incident light is defined as the transmission of said spot. The optical density or shortly the intensity is defined as $-{}^{10}\log$ of the transmission. Thus the optical density is a dimensionless unit. The integral of the optical density of a well defined area is proportional to the amount of silver deposited in the surface of the photographic film. In the following description the expression of "absolute optical density" is defined as the density measured in relation to a density level generally corresponding to the optical density of an unexposed film. The expression "relative density" is defined as the absolute optical density minus the absolute optical density as extrapolated in the way to be described of the neighbourhood of said spot.

A problem encountering in connection with the analysing of the density of separate spots is to establish the contour of the spot. This problem is readily recognized if the intensity of a spot is so weak in comparison with the intensity of the background that the spot can hardly be separated from the background. The problem is particularly serious since the density of the background will not be constant in the neighbourhood of a prospective spot. This is the case, since the density of the background will vary from point to point in the neighbourhood of the spot. In connection with x-ray photographs this variation may for example be derived from the fact that x-rays which are not completely monocromatic have been used.

If the absolute optical density of a spot lies in the vicinity of the density of the background it has not been possible to measure the density of weak or faintly blackened spots with the principal best accurancy with the heretofore used devices for density measurements, the so called densitometers, and the heretofore used analysis programs. In connection with crystallographic investigations of macromolecules this is regretful since the number of faintly blackened spots to be measured is very high. The method and the apparatus according to the present invention makes its possible to increase the accurancy in connection with the evaluation of the integrated density of weak blackened spots and moderately blackened spots. According to the invention a certain area of a film is scanned with a light beam in successive scans to measure the optical density of the illuminated area. When the existence of a spot has been proved — in accordance with one or more of the existence conditions described later on — the boundary points — which have been established during one or more successive scans — of all or of a part of the contour of the spot are stored in the form of electrical values in a memory.

The object the density of which is to be measured must of course be defined in one way or another. Non-relevant spots, for example "fuzz," overexposed spots and the like must not be included in the calculation.

According to the invention the existence of a spot is established primarily with regard to the provision that the extension of the spot in the direction of the scanning beam must at least within an area of one scan be longer than a predetermined length.

According to the invention the existence of the spot is also established with regard to the additional condition that the relative optical density of the spot at least on the same scan which is used for the examination of the spot with regard to the first provision, must exceed a predetermined value above the absolute optical density of the background and that when the two provisions concerning the existence of a spot both are fulfilled the boundary points of the contour of the spot which have been established during one or more successive scans are stored in the form of electrical values in a memory.

Thus the first condition implies that a spot shall have at least a minimum extension in one direction in order that its contour shall be stored in the memory. Non-representative spots will thus be discarded. The second doncition implies that the maximum relative optical density of a spot must exceed a predetermined, minimum value in order that the contour of the spot shall be stored in the memory. Since this predetermined value exceeds the variation of the absolute optical density of the background the probability of evaluation of non-representative spots is decreased.

For the density evaluation according to the present invention a so called microdensitometer is used. The microdensitometer is provided with a program controlled scanning system. In operation a well defined area around a spot is first scanned with the light beam. During this scan the maximum relative optical density of the spot is calculated. If this value exceeds a predetermined value, for example OD = 0.3 units, a program control circuit will bring the scanning system to operate in accordance with a first program according to which an examined area will be successively scanned a second time during which the boundary points of the contour of the spot will be stored in the memory and also a third time during which the absolute optical density of the spot will be successively integrated between the boundary points of the contour of the spot, said boundary points having been stored in the memory during the second scanning. If the relative optical density falls below said predetermined value the program control circuit will pick a second program according to which said area will be scanned only a second time during which successive integration of the absolute density values of the spots will be performed between the boundary points of the contour belonging to the latest spot stored in the memory and having a maximum relative optical density exceeding said predetermined value.

If the result of the first scan of said area gives the result that the maximum absolute optical density of the spot exceeds OD = 1.5 units the scanning system will be run in accordance with a third program according to which the scanning of said area will be immediately interrupted. Thus the first and the second program will be entered only when the absolute optical density of the spot falls below 1.5 units. During the first program the memory is of course erased before any new boundary points are stored therein in the form of electrical voltages.

An important feature of the present invention lies in the fact that when the relative optical density value is less than 0.3 units the contour of the lates spot recorded in the memory is "borrowed" and is used as the contour of said spot the relative optical density of which is less than 0.3 units.

The reason why spots having an absolute optical density exceeding 1.5 units shall not be examined is that photographic films are not blackened in proportion to a too long exposure thereof. The spot lies with other words within the area of the overexposure on the gamma curve of the photographic film.

The predetermined, minimum value of the density has in an preferred embodiment of the invention been experimentally established to be OD = 0.3. However, the invention is not in any way restricted to this value. The reason why the value of 0.3 units has been selected is that the variation of the background in relation to the density of the spot becomes utmost important at this density level. I have experimentally found that OD = 0.3 is a value below which the contour of latest spot stored in the memory shall be "borrowed" and be used as the contour of the weak spot. It was previously mentioned that when establishing the existence of a spot the relative optical density of the spot should lie above that of the background variation. This value (Dix) of the relative optical density has been established empirically.

The evaluation of the relative optical density requires knowledge of the absolute optical density of the background within the spot itself as well as in the neighbourhood of the spot. When evaluating the background in these areas the means value of the absolute density of the background is first determined during a short period in the end of a scan. This mean value is calculated on basis of the integral of the absolute density divided with the integration time and will be represented by an analog voltage. In similar manner the mean value of the absolute density is calculated during a short period in the beginning of the next scan. This mean value will also be represented by a voltage. A reference voltage which may be regarded as the optical density of the background is then linearly interpolated between these two mean values. It is recognized that the absolute optical density of the background is not constant over scan but will raise in a linearely manner in the scanning direction.

In the presently used microdensitometers a light beam illuminates a local area of the film. A photomultiplier then measures the transmitted light. The output signal from the photomultiplier is passed through a log-converter and the logaritmated voltage will thus be a measure of the absolute optical density of the local area of the spot. In the presently used systems the light beam scans each separate spot in the x-ray photograph in accordance with different methods. According to a first method the light beam is fixed while the photographic film is moved in two perpendicular directions, usually the so called x and y-directions. According to a second method the film is fix and the light beam scans the spots in both the x and y-directions. The stability of the sensitiveness and the accuarancy is very good with the first method while not so good with the second method. When using the first method it is an indispensable requirement that the very large number of measurements must be recorded in a digital computer memory or in a magnetic tape station. If the costs for the subsequent data processing are to be kept within resonable limits the resolution will not be so good with the first method. The resolution achieved with the second method will be delimited due to stray radiation.

An object of the present invention is a scanning system having the advantages of the two methods referred to above but delimiting the drawbacks thereof to the greatest possible extent. The field of use of the scanning system according to the present invention is not delimited to microdensitometers but the scanning system may be used separately or in combination with other, e.g., electrical, mechanical or electromechanical units. According to the present invention a light beam scans the film in one direction, the y-direction. The light beam also travels in sweeps over the film surface in a second direction, the x-direction, perpendically to the scanning direction. These sweeps in the x-direction have a predetermined lenght. Upon completemention of a x-sweep the light beam is blanked and the film is moved in the y-direction a distance exactly corresponding to the width of the beam in the y-direction. The x-direction will herein be referred to as the sweep direction while the y-direction will be referred to as the scanning direction. The beam travels with constant speed in the sweep direction. The area of the film being illuminated by the light beam is very well defined and also small in comparison to the area of the spot. Thus a large number of sweeps are required to cover the entire area of the spot. In a preferred embodiment of the invention the number of sweeps may lie between 20 and 40. The scanning system according to the present invention comprises a lamp the light from which is focused onto an elongated aperture in a stationary plate. Between the stationary plate there is provided a rotating disc in the periphery of which a number of radially extending slots are provided. The slots are equally spaced around the periphery of the disc. The disc rotates with constant speed and the slots in its periphery are brought over the elongated aperture in the plate whereby a narrow light beam having a constant cross section will be formed. A mirror and lens arrangement focuses the light beam onto the photographic film the surface of which will be scanned in the y-direction and swept in the x-direction. It should be noted that the light beam is not reciprocating. On the contrary the light beam travels in one and the same direction all the time. When a slot in the rotating disc has passed over the elongated aperture in the plate a step motor steps the film in a direction perpendicular to the sweep direction a distance corresponding to the width of the light beam in the y-direction. The next slot in the disc is then moved over the elongated aperture thereby starting a new sweep over a new, local area of the film. This is repeated until a predetermined length along the y-direction of the film has been scanned. A second step motor then steps the film in the x-direction a distance corresponding to the length of a sweep in the x-direction. This is repeated until the entire film surface has been analysed. It is recognized that the optical density is measured simultaneously with the sweeping of the light beam in the x-direction. It is also recognized that the step motor stepping the film in the y-direction is synchronized to the rotation of the disc.

During the examination of a spot the sensitivity of the scanning system must remain constant in all the points along a sweep. With other words two portions of a spot having identical intensities must give rise to one and the same result when measured independently of the position of the portions in the sweep.

With the first method referred to above the sensitivity of scanning system is constant whereas the sensitivity of the second method varies along the scanned area. With the second method a compensation for the sensitivity must be made in two dimensions. Every single sweep must thus be given a separate compensating function. With the scanning system according to the present invention the accuracy may be selected as high as desired with a simple, non-linear circuit which only must be checked each time the lamp of the scanning system is replaced (at about 500 hours' interval).

Several modifications of the scanning system are possible. Instead of the rotating, slotted disc a slotted band placed behind the stationary plate may be used, said slotted band being moved in the direction of the elongated aperture in the plate.

According to a preferred embodiment of the invention the contour of a spot can be established in the following manner:

In a comparison circuit the voltage signal D from the log-converter is compared with the linearly extrapolated background voltage B. Each time the voltage signal (D) from the log-converter crosses the background voltage (B) the polarity of the output signal from the comparison circuit is reversed. The time during which the output signal from the comparison circuit is positive is then measured in an electrical circuit and said time is thus representing the extension of a locally swept area of a spot. If this time exceeds a predetermined value $t_s$ another electrical circuit is tripped which upon the next polarity reversion of the output signal from the comparison circuit is arranged to calculate the coordinate of the position of the light beam above the contour of the spot, i.e., the last coordinate or boundary point $t_4$ of the contour of the spot as seen in the sweep direction. Having the knowledge of the boundary point $t_4$ and time during which the output signal from the comparison circuit was positive the first coordinate or boundary point $t_3$ of the contour of the spot as seen in the sweep direction may be calculated.

In connection with the analysis of one single macro molecule structure hundreds of x-ray photographs are used and hundred thousands of density measurements are made. It is obvious that a low cost for the subsequent data processing of the results of the measurements is of utmost importance. From economical point of view it is an advantage if it is possible to use an analog representation of the data material, i.e., analog memories. In connection with the second method referred to above this is principally possible but in connection with the first method it is quite impossible. An object of the present invention is to eliminate these drawbacks to the greatest possible extent by using a fully automatic microdensitometer using a program controlled scanning system. It will then be possible to drastically reduce the time required for a subsequent processing of the data material. Tests have proved that the costs for the data processing of a x-ray diffraction film analysed with a semi-automatic microdensitometer using the principles according to the present invention, i.e., a densitometer having a similar basic function as the fully automatical one but not any fully automatical stepping system for the frame holding the film will be three if not more times less than the costs of the data processing of corresponding films being analysed with a commonly used microdensitometer. If consideration also is taken to the desired resolution an estimated comparison as regards the cost between the fully automatical densitometer according to the present invention and a commonly used densitometer will be about 1:6. Further to this the initial expenses for the fully automatical densitometer according to the present invention and its peripheral equipment will be less than those for the commonly used densitometers.

Figure 6:
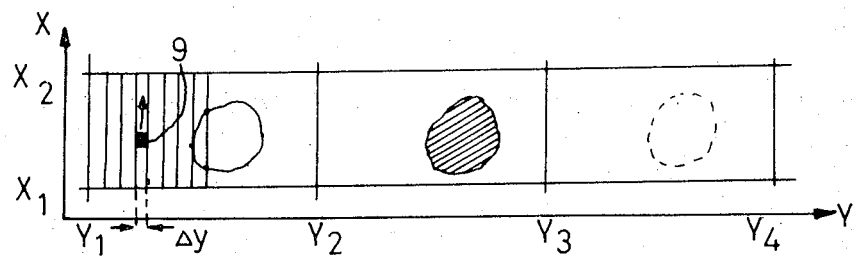
Figure 7:
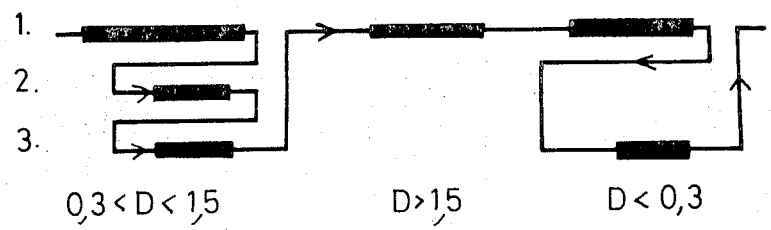
Figure 8:
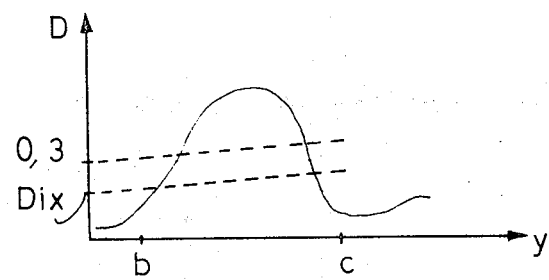
Figure 9:
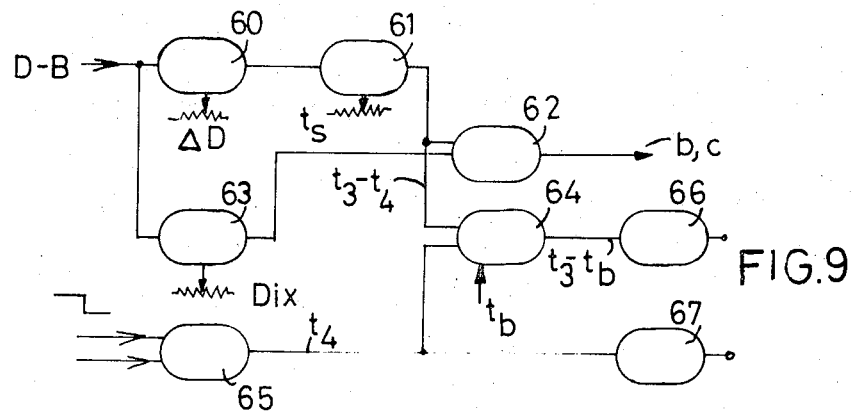
Figure 10:
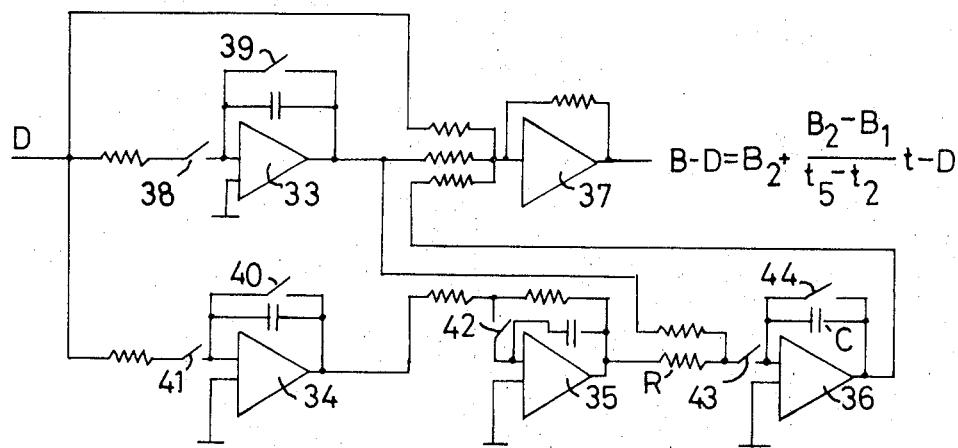
Figure 11:
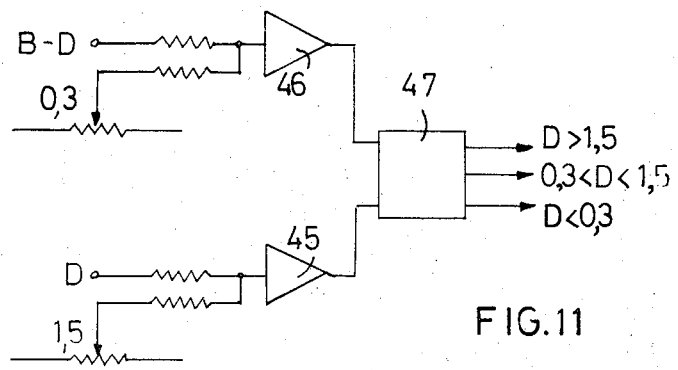
Figure 12:
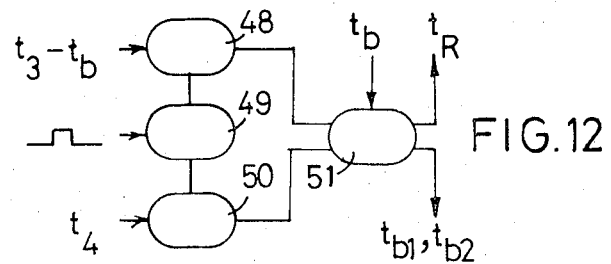
Figure 13:
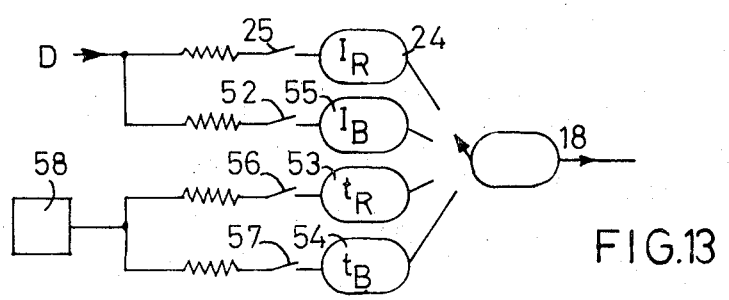

The novel features believed characteristic of the present invention are set forth in the appended claims. The invention itself, both as to its preferred embodiments and mode of operation, together with further objects and advantages thereof, may best be understood with reference to the following detailed description taken in connection with the appended drawings in which:

FIG. 1 is a generalized isometric view showing the scanning system according to the present invention, FIG. 2 is a block diagram showing a fully automatical microdensitometer built in accordance with the principles of the present invention, FIG. 3 is a block diagram showing a circuit for determination of the absolute optical density (intensity) and a circuit for the integration of the intensity, FIG. 4 shows the way in which a spot is scanned, FIG. 5 shows the variation of the absolute optical density during a sweep over a local area of the spot shown in FIG. 4, FIG:S 5A–F show different pulse wave forms appearing in different electrical circuits used in connection with the investigation of the existence of the spot, its contour and density, FIG. 6 shows three well defined areas around three different spots blackened in different degrees, FIG. 7 shows the scanning of a well defined area in accordance with a first, a second and a third program respectively, FIG. 8 shows the variation of the optical density of a spot in a direction perpendicular to the sweep direction, FIG. 9 shows the circuits used for the determination of the contour of a spot, FIG. 10 shows a circuit for generating an extrapolated background within and in the neighbourhood of a spot, FIG. 11 shows the program control circuit, FIG. 12 shows coincidence circuits for the integrating circuit of FIG. 3 and FIG. 13 shows integrating circuits used for the calculation of the density of the spot.

An embodiment of the scanning system according to the present invention is shown in FIG. 1. A light source 1 emits light which is focused onto an elongated aperture 2 in a stationary plate 3. The light source may for example comprise a tungsten lamp having an elongated filament which is arranged in parallel to said aperture 2. Behind the stationary plate 3 there is a rotatably mounted disc 4 having a number of equally spaced, radially extending slots 5. The angular distance between each slot 5 is equal or longer than the length of the aperture 2 in the plate 3. When disc 4 is rotated in the direction indicated by arrow 10 a narrow light beam 9 is formed, said beam travelling from the left to the right along aperture 2 as seen from the right in FIG. 1. The light beam will "disappear" to the right at the moment when the entire aperture 2 is covered by the area between two successive slots 5 in disc 4 and it will turn up again in the left portion of aperture 2. A lens and mirror arrangement 6 then directs the light beam onto a photographic film 7 which will be illuminated by the light beam. Disc 4 is driven by a motor not shown, said motor having a constant r.p.m. Thus light beam 9 sweeps the surface of the film at a constant speed. Thus there is a linear relationship between the distance travelled by the beam (over the film surface in the sweep direction $x$) and the time required for the beam 9 to run this distance. This linear relationship is used for position and time calculations to be described and makes it possible to design the integrating circuits to be described with a very high degree of accuracy since integration is more convenient to execute with regard to the time rather than with regard to the distance. The length of the elongated aperture 2 depends on the desired lenght of the sweep in the sweep direction $x$. Aperture 2 may conveniently be slightly arched thereby improving the accurancy of the system. The radius of curvature of the aperture may be selected to correspond to the radius of the rotating disc 4. The width of the aperture 2 and of the slots 5 is dependent on the desired decree of resolution. In one embodiment of the invention the dimensions of the beam illuminating the surface of the film were 1.6 × 1.6 mils. Other dimensions may easily be obtained by exchanging lenses, disc and/or plates. In another embodiment of the invention the rotating disc 4 may be replaced with an endless belt rotating behind an aperture 2 with constant speed.

An x-ray photograph is for example exposed on the photographic film 7. The film 7 is fixed between two glass plates in a frame not shown, said frame being movable in two perpendicular directions. A step motor indicated by a block 13 in FIG. 2 steps the frame in the $y$-direction and another step motor indicated by block 14 steps the frame in the $x$-direction. Each time the light beam 9 has completed a sweep in the $x$-direction step motor 13 is activated to move the frame in the $y$-direction. The distance to be moved in the $y$-direction corresponds generally to the width $\Delta y$ of the beam in the $y$-direction. When the entire area indicated by the parallel broken lines in the $y$-direction in FIG. 1, has been scanned step motor 14 is activated by a line changing device not shown to step the frame in the $x$-direction. The length of this step in the $x$-direction corresponds to the distance between two lines of spots appearing in the x-ray photograph. Then the linewise sweeping of the light beam in the $x$-direction is started again. Upon completement of a sweep in the $x$-direction synchronizing pulses, clock pulses, are generated in a central synchronizing circuit represented by block 12 in FIG. 2. In a preferred embodiment of the invention this synchronizing circuit 12 may comprise a photocell 8 shown in FIG. 1, said photocell being stationary arranged on plate 3 behind disc 4 which is illuminated by a light source not shown in order to activate said photocell 8. Every time a slot 5 lies in the light path from said last mentioned, not shown light source photocell 8 generates a clock pulse. The position of the photocell on plate 3 is for example so selected that a clock pulse is generated immediately upon the start of a sweep of the light beam over the film surface. A certain portion of the light incident on a film 7 is transmitted through the film. The ratio between the intensity of the transmitted light and the intensity of the incident light is measured by a photomultiplier 11 shown in FIG. 3. The photomultiplier 11 generates a current being proportional to the transmission of the illuminated surface. The current from the photomultiplier is converted into a voltage in an operational amplifier 21. The output voltage from operational amplifier 21 is fed to a log. converter indicated by operational amplifier 22 the output voltage of which thus indicates the absolute optical density of the illuminated film surface. The output voltage from operational amplifier 22 is finally amplified in an operational amplifier 23.

Upon calculation of the integral of the absolute optical density of the illuminated film surface the output voltage from operational amplifier 23 is fed via a switch 25 to the input of an integrating circuit 24. Switch 25 is normally open. During the integration — when switch 25 is closed — a capacitor 26 connected in parallel with the integrating circuit 24 is charged to a voltage the magnitude of which gives a direct, analog reading of the integral of the absolute optical density of the illuminated local area of a spot being swept in the $x$-direction. It should be emphazied that those time periods during which switch 25 is closed will determine that portion of a sweep in the $x$-direction during which integration shall be executed. Since the speed of the sweep is constant the time during which the integration is executed will be directly proportional to the distance travelled by the light beam over the film surface during one sweep in the $x$-direction.

It has been previously mentioned that the sensitivity of the scanning system must remain constant along the sweep distance. The term "sensitivity" as used herein denotes the ratio between the transmission of the film and the voltage corresponding to the absolute optical density. For correction of any variations in the sensitivity the lens system 6 is so selected and positioned that it images aperture 2 on the surface of the film. A similar lens system, not shown, is also positioned between the film and the photomultiplier and is so dimensioned that it images the first lens system on the cathode surface of the photomultiplier. Thereby is achieved that the light beam travelling in aperture 2 will be imaged with substantially one and the same area on the cathode of the photomultiplier during the entire sweep. Thereby is achieved that one and the same light intensity will always produce one and the same current in the photomultiplier. Since the cross section of the sweeping light beam always will be the same on the film surface in all positions along the sweep there is no need for compensation of a variable cross section. Due to inherent deficiencies in the optical system additional corrections must be provided in order that the sensitivity shall remain unchanged over the entire sweep distance. According to the invention this correction is achieved by applying to the input of operational amplifier 23 a compensation voltage of such a character that when the light beam for test purposes only sweeps in air, i.e., the film being removed from its frame and the transmission being = 1 unit, the output signal from amplifier 23 will be constant during a sweep. This compensation voltage is generated in a non-linear circuit 71 (FIG. 3) to which a ramp voltage is applied at 73, said ramp voltage starting synchronously with the start of each sweep. Said non-linear circuit 71 is provided with a number of adjusting inputs 72 each of which is associated to a predetermined position of the light beam in a sweep. To these adjusting inputs 72 correction voltages are applied which during the adjustment of the non-linear circuit are varied by means of potentiometers not shown. Since each input 72 corresponds to a predetermined point of a sweep it is possible by proper adjustment of the different potentiometers to achieve a constant output voltage from amplifier 23 when the light beam sweeps in air. Having achieved such a constant output voltage from amplifier 23 the scanning system has been sensitivity corrected. The number of inputs 72 to the non-linear circuit 71 can be increased thereby increasing the sensitivity of the scanning system to any desired degree.

As appears from FIG. 3 a switch 27 is also connected in parallel over a capacitor 26. The purpose of switch 27 is to reset capacitor 26 acting as an analog storage cell. This resetting is performed by a clock pulse from the central synchronizing unit 12 (FIG. 2). However, before the resetting of capacitor 26 the information contained therein is recorded on a data carrier 20 (FIG. 2) after conversion into digital form by an analog-digital converter 18 and into series information by an input device 19. For the calculation of the density of a spot a mere integration of its optical density is not sufficient but the integral of the absolute optical density in the neighbourhood of the spot must also be calculated which will be described later on. Before the circuit controlling the opening and closing of switch 25 is described the way in which the optical density in the neighbourhood of a spot is measured shall be described in connection with FIG:S 4 and 5. During the linewise scanning of light beam 9 in the x-direction of spot 28 and its neigbourhood the output voltage from operational amplifier 23 varies in accordance with graph 31 in FIG. 5. Said graph is plotted in a diagram the vertical axis of which indicates the optical density and the horisontal axis of which indicates the time, i.e., the distance travelled by the light beam during one sweep. From the graph of FIG. 5 it is recognized that the optical density of the background varies along the sweep direction of light beam 9. When calculating the integral of the relative optical density of spot 28 the integral of the absolute optical density of the background should be eliminated. One thus wants to measure the area lying above the absolute density of the background but below graph 31. In the heretofore used methods for the calculation of the optical density sufficient consideration has not been taken to the variation of the optical density of the background in the neighbourhood of a spot 28, but instead a mean value of the background has been calculated in points comparatively far from the spot, said mean value then having represented a more or less estimated value of the absolute optical density of the background. The accurancy of this method is bad. Weak spots, i.e., spots having low optical density values have for example not at all been taken into consideration in connection with the final evaluation of the optical density calculation. According to the present invention the optical density of the spot is calculated in such a manner that optimum consideration will be taken to the background, even in the case where the contour of the spot is practically impossible to discern. In connection with the calculation of the optical density non-representative spots, for example fuzz, overexposed spots and the like will not be included in the evaluation. I have found that the following conditions must be fulfilled either separately or in combination with each other in order that a spot shall be measured. A first provision which must be fulfilled is that the extension of a spot in the sweep direction of the light beam must be longer than a predetermined distance.

A second provision that must be fulfilled is that the relative optical density of the spot must at least during one sweep exceed a predetermined value (Dix) higher than that of the background variation.

A third provision which must be fulfilled is that the extension of the spot in a direction perpendicular to the sweep direction must be longer than a predetermined distance.

In a preferred embodiment of the invention the conditions of existence must be fulfilled simultaneously in order that the spot shall be measured.

It has been indicated that the existence of a spot can not be predicted if the maximum relative optical density of the spot falls below 0.3 units. In the same way it has been empirically established that a spot the maximum absolute optical density of which exceeds 1.5 shall not be taken into consideration in connection with the integration since the density of such a spot is so high that its intensity is not proportional to its exposure.

According to the present invention the exposed film is scanned in the following manner. A well defined area around a spot is scanned a first time by light beam 9. FIG. 6 shows a portion of a film and three well defined areas around three spots having different optical densities. The well defined areas are referred to as $y_1 \rightarrow y_2$, $y_2 \rightarrow y_3$ and $y_3 \rightarrow y_4$. All the areas have the same extension in the x-direction, viz. $x_1 \rightarrow x_2$. During the first scanning, step 1, of the first area $y_1 \rightarrow y_2$ the existence of the spot having a well defined contour is tried and the relative optical density of a spot is measured. If the maximum relative density exceeds 0.3 simultaneously as its absolute optical density falls below 1.5 a program control circuit 47 shown in FIG. 11 brings the scanning system to operate in accordance with a first program. According to this first program step motor 13 leads the frame and thus also the film 7 back to the starting position $y_1$ upon termination of the scanning in the y-direction at the end position $y_2$. Then a second scanning, step 2, of area $y_1 \rightarrow y_2$ begins and during this second scanning the coordinates of the contour of the spot are calculated, the memory is reset before the storing of the coordinates and the coordinates are recorded in the memory, which preferably is of the analog type. Upon completement of said second scanning of area $y_1 \rightarrow y_2$ in accordance with the first program the frame again is led back to the starting position $y_1$ and a third scanning, step 3, of area $y_1 \rightarrow y_2$ takes place. During this third scanning of area $y_1 \rightarrow y_2$ the optical density of spot 28 is integrated, the absolute optical density in the neighbourhood of spot 28 is also integrated and certain quantities required for the final evaluation of the optical density of the spot are also integrated. Upon compcletment of the third scanning of area $y_1 \rightarrow y_2$ step motor 13 steps the frame to the next following well defined area $y_2 \rightarrow y_3$ which is scanned with regard to the relative optical density of the spot. A comparison circuit 45 (FIG. 11) delivers a signal when the absolute density of the spot exceeds the value of 1.5 units and the program control circuit 47 brings the scanning system to operate in accordance with a third program according to which the frame is immediately moved to the next following well defined area, in this case $y_3 \rightarrow y_4$, to scan this area with regard to the existence of representative spots and calculation of the absolute optical density of such spots. For the sake of discussion it is assumed that the spot in the area $y_3 \rightarrow y_4$ has a maximum relative optical density falling below 0.3. During the first scanning of area $y_3 \quad y_4$ the comparison circuit 46 in FIG. 11 establishes that the maximum relative optical density of the spot falls below 0.3 and the program control circuit 47 then brings the scanning system to operate under control from a second program according to which only steps 1 and 3 referred to above are executed. Upon termination of the first scanning of this area $y_3 \rightarrow y_4$ the scanning system is so programmed that the coordinates of the contour of the last spot stored in the memory and having a maximum relative density exceeding 0.3 but not 1.5 are borrowed from the memory. During the second scanning of area $y_3 \rightarrow y_4$ the optical density of the spot is then integrated on basis of the coordinates borrowed from the memory in the same way as in step 3 of the first program. In an embodiment of the invention the number of coordinates stored in the memory and belonging to one and the same contour are about 40. These coordinates are stored in 40 separate capacitors which act as storage cells and are similar to the capacitor shown in FIG. 3. When the second scanning of the third, well defined area $y_3 \rightarrow y_4$ is finished and thus the integral $Y_R$ of the absolute optical density of this spot, the integral $I_B$ of the absolute optical density in the neighbourhood of said spot and certain other integrals have been calculated the values of these integrals are recorded on data carrier 20 for example a punched band, via A/D converter 18 and input device 19. The scanning of the next succeeding well defined area will then continue in accordance with step 1.

In order to be able to determine the relative optical density of the spot during the first scanning of an area a continuous comparison is made between the output signal from amplifier 23 and a signal representing the absolute optical density of the background. This comparison is continuously made during each sweep in the x-direction. With reference to FIGS. 5 and 10 the extrapolation of a voltage representing the absolute optical density of the background will be described. Operational amplifier 33 shown in FIG. 10 determines the mean value of the background between times $t_1$ and $t_2$ (FIG. 5). Switch 31 is thus closed during time interval $t_1 - t_2$. Switch 39 which is used for the resetting of the capacitor shown is closed between time intervals $t'_5$ and $t_1$. A second operational amplifier 34 calculates the mean value of the background between times $t'_5$ and $t'_6$. Switch 42 associated with operational amplifier 34 is thus closed during time interval $t'_5 - t'_6$. A capacitor connected in parallel with the operational amplifier 34 is reset during time interval $t_5 - t_2$ by switch 40. Before resetting the capacitor associated with operational amplifier 34 the voltage ($B_2$) over this capacitor is transferred by way of operational amplifier 35 to a capacitor connected in parallel with this amplifier. This transfer is also controlled by a switch 42 which is closed during time interval $t_2 - t'_6$. Upon completement of the transfer the capacitor connected in parallel with operational amplifier 34 is discharged. In an operational amplifier 36 a ramp voltage kt is generated between the voltages indicated as $B_2$ and $B_1$ in FIG. 5, said ramp voltage having the slope $K = (B_2 - B_1)/RC$. RC is a constant selected to correspond to time interval $t_5 - t_2$. This ramp voltage is applied to the input of operational amplifier 37 to which also the voltage corresponding to the optical density of the present illuminated film surface is applied. Operational amplifier 37 thus delivers a signal which can be written as:

$$B - D = B_1 + \{(B_2 - B_1) RC\} t - D$$

or $$B = B_1 + \{(B_2 - B_1) RC\} \cdot t$$

At time $t_2$ during a sweep in the x-direction the ramp voltage from operational amplifier 37 thus starts with an initial value $B_1$. The output voltage will increase linearly up to the value of $B_2$ which is reached at time $t_5$. Thus a voltage representing the absolute density of the background has been extrapolated. This voltage is indicated at 30 in FIG. 5.

In FIG. 11 the program control circuit used in connection with a first scanning of a well defined area is shown. The program control circuit comprises two comparison circuits 45 and 46. Comparison circuit 46 continuously compares the relative optical density, i.e., the output voltage from operational amplifier 37, with a reference voltage corresponding to a relative optical density value of 0.3. In case $D-(B+0.3) > 0$ the comparison circuit will produce a signal setting the program control circuit 47 in such a state that the scanning system will operate under control of the first program. In similar manner comparison circuit 45 continuously compares the absolute optical density with a predetermined reference voltage value corresponding to an absolute optical density of 1.5. In case $D - 1.5 > 0$ this circuit will produce a signal setting the program control circuit 47 in such a state that the scanning system will operate under control of the third program. In case none of these signals are present the program control circuit 47 will bring the scanning system to operate in accordance with the second program.

The calculation of the coordinates of the spot, i.e., a part of step 2 shown in FIG. 7, is performed in the following manner. From output signal D from amplifier 23 the extrapolated background voltage 30 is subtracted and the result is continuously compared in a comparison circuit 60 shown in FIG. 9 with a voltage corresponding to the relative optical density $\Delta D$. This voltage $\Delta D$ is indicated at 32 in FIG. 5. $\Delta D$ is so selected that the background variation will fall below line 32 as much as possible. When graph 31 crosses line 32 the polarity of the output signal from the comparison circuit 60 will be changed in the manner indicated in FIG. 5A. It is apparent that the duration of the positive period of the output signal from comparison circuit 60 directly corresponds to the extension of the local area of the spot. When this period is sufficiently long, i.e., the first existence condition referred to above is fulfilled, it is apparent that with knowledge of the length of the time period and the time at which the polarity did change one can calculate the coordinates of the contour of the spot 28 in FIG. 4. Each time the polarity changes from the negative to the positive a ramp voltage generator 61 is started. The output voltage from said generator 61 will immediately fall to zero when the polarity changes from the positive to the negative except in the case when the output voltage from the ramp voltage generator 61 has reached a predetermined amplitude corresponding to time $t_s$ shown in FIG. 5B. If the output voltage from ramp generator 61 exceeds the voltage corresponding to time $t_s$ the ramp generator will lock at the voltage attained at this moment which in this case is referred to as $k \cdot t_{34}$ in FIG. 5B. This voltage is stored in an analog storage cell not shown. When light beam 9 passes the point of the film surface at time $t = 0$ a second ramp voltage generator 65 is started the output voltage of which is not locked until ramp generator 61 is locked. This second ramp voltage generator 65 produces an output voltage being proportional to the distance travelled by the light beam over the film surface in the x-direction during each sweep. It is assumed that the slope of the two voltages from these ramp generators are equal. The output voltage from the second ramp voltage generator 65 thus locks at time $t_4$ and is shown in FIG. 5D. This voltage is indicated at $kt_4$ and is thus a measure of the second — as seen in the sweep direction $x$ - coordinate of the contour of the local area. This second coordinate is stored in a separate storage cell 67.

In a subtracting circuit 64 voltage $kt_{34}$ is subtracted from voltage $kt_4$ thereby terminating the calculation of the first coordinate $t_3$ — as seen in the sweep direction $x$ — of the contour of the scanned local area of the spot. The coordinate $t_3$ is modified in a circuit 64 for a purpose to be described later on. The modified coordinate which will be referred to as $t_3-t_b$ is stored in a separate storage cell 66.

Integration of the optical density of a spot is executed in the following manner:

When the light beam during the third step successively sweeps over the previously — during step 2 — swept well defined area a comparison circuit 48 shown in FIG. 12 starts a continuous comparison of the voltage stored in storage cell 66 and thus corresponding to the modified coordinate $t_3 - t_b$ with ramp voltage generated by a ramp voltage generator 49. The ramp voltage is started at the beginning of each x-sweep by a clock pulse from the central synchronizing circuit 12, said clock pulse being applied to generator 49 at the input indicated with an arrow in the drawing. In the same manner a continuous comparison is made in a second comparison circuit 50 between voltage $kt_4$ and said ramp voltage the amplitude of which thus corresponds to the x-position of the illuminated spot in the local area. Having the knowledge of the slope of the ramp voltages, the coordinate $t_3 - t_b$, the coordinate $t_4$ and the length of pulse $t_b$ a ramp and coincidence circuit 51 will be able to calculate the time interval $t_R$ (FIG. 5F) during which switch 25 shall be closed for the integration of the density and time intervals $t_{b1}$ and $t_{b2}$ (to be described later on). Thus the charge stored in capacitor 26 will correspond to a sum of successive charges which have been stored during successive x-sweeps between for example points $b - c$ shown in FIG. 4.

The start and stop respectively of the contour recording in the direction perpendicular to the sweep direction, i.e., in the y-direction, is determined by the circuit shown in FIG. 9. In the polarity sensitive circuit 60 a voltage $D - b$ is compared in a comparison circuit 63 with a voltage corresponding to said previously known, relative optical density value Dix which is smaller than 0.3 units but higher that the variation of the background. The output signals from the comparison circuits 61 and 63 are compared in a circuit 62 which will produce an output signal indicating the beginning and the end respectively of the contour in the y-direction. The length of the output signal is compared with a previously known quantity, for example a number indicating a minimum number of sweeps in order to determine whether the width of the spot — as seen in the y-direction — is longer than a predetermined, minimum distance. In a preferred embodiment of the invention these two existence conditions should be fulfilled simultaneously thereby eliminating the probability of evaluation of non-representative spots.

An integrating circuit 55 shown in FIG. 13 integrates the absolute optical density in the neighbourhood of the spot, for example spot 28 in FIG. 4. Thus a broken belt 29 (FIG. 4) around the spot will be integrated. In order to improve the density calculation the scanning system may be arranged to perform some few additional sweeps outside area $b - c$. The integration is executed during time intervals $t_{b1}$ and $t_{b2}$ shown in FIG. 5F, said time intervals thus forming parts of said belt 29. The duration and position respectively of time intervals $t_{b1}$ and $t_{b2}$ is adjusted in relation to time interval $t_R$ of the spot, said interval $t_R$ been shown in FIG. 5E. An additional integrating circuit 53 (FIG. 13) comprises a storage cell in the form of a capacitor. Said capacitor is charged from a constant voltage source 58 during time periods $t_R$ during each x-sweep. In another integrating circuit 54 another capacitor acting as a storage cell will be charged from constant voltage source 58 during time periods $t_{b1}$ and $t_{b2}$ during each x-sweep. Upon termination of the scanning of spot 28, i.e., when the spot has been investigated in accordance with the first or the second program, following quantities are stored in analog form in the capacitors in the different integrating circuits 24, 55, 53, 54: the integral of the absolute optical density $I_R$ of the spot, the integral $I_B$ of the absolute optical density of the background, the integral of time $t_R$ and the integral of time $t_b$. These quantities are converted in the analog/digital converter 18 into binary form and are recorded on data carrier 20. In the final data processing the following expression is calculated:

$$\text{const} \cdot \left\{ \sum_{i=1}^{n} \int_{t_3}^{t_4} D dt - \frac{\sum_{i=1}^{n} tR_i}{\sum_{i=1}^{n} tB_i} \sum \frac{}{\left[ \int_{t_{b1}} D dt + \int_{t_{b2}} D dt \right]} \right\}$$

where $n$ = number of sweeps, $i = 1, 2, 3 \ldots n$.

This expression indicates the net amount of deposited silver in the spot and thus also the density of the spot. It should be noted that the expression above may be calculated with analog quantities in circuits similar to those described above. However, in the preferred embodiment of the invention it has been found to be convenient to record the values of these integrals on a separate data carrier.

In the foregoing description the contour has been stored during one sweep and the integration has been executed during the next sweep. However, it is possible to store the contour during one sweep and to integrate in a subsequent sweep.

The circuits described for the time and position measurements have indicated the time and the position respectively in the form of voltages. However, it is obvious that the position and the time respectively, can be indicated in other forms, for example in the form of pulses, numbers etc, if other types of circuits are used.

The preferred embodiment of the invention may be modified and varied within the scope of the following claims.

What I claim is:

1. A method of calculating the blackening of spots, particularly weakly blackened spots, exposed on photographic film, said method comprising the steps of
   i. line-wise scanning a well defined area of the film with a light beam
   ii. detecting the light transmitted through the film and
   iii. converting the detected light into an electric signal the magnitude of which then corresponds to the absolute optical density of the area being illuminated by the beam,
characterized by the following steps
   a. measuring the relative optical density along each scanned line simultaneously with
   b. deriving the coordinates of the coutour of the spot being measured, said coordinates being related to the relative optical density of the spot being measured,
   c. storing in a memory the absolute optical density values measured during each scanned line or only said coordinates,
   d. classifying the spot with regard to its relative optical density and the extension of its contour in order to eliminate any further calculations on non-relevant exposed spots, "fuzz" and the like, and
   e. integrating the relative optical density of the spot only within its contour.

2. The method as claimed in claim 1, characterized by moving the light beam with constant speed over the film surface while the film is at rest and moving the film in a direction perpendicular to the line a distance corresponding to the extension of the light beam in said perpendicular direction during two successively scanned lines.

3. The method as clained in claim 2, characterized in that the illuminated area of the film is generally rectangular and has an area of which is maintained constant during scanning.

4. The method as claimed in claim 1, characterized in that the relative optical density is measured by the following steps
   i. detecting the mean value of the absolute optical density during a short period ($t_1$–$t_2$) at the beginning and during a short period ($t_5$–$t_6$) at the end of each scanned line
   ii. linearly extrapolating between said two mean values in order to derive values representing the absolute optical density at the background of the spot for each scanned line
   iii. substracting the absolute optical density of the extrapolated background from the absolute optical density values of the scanned line.

5. The method as claimed in claim 4, further characterized by the addition of a constant ($\Delta D$) the magnitude of which generally corresponds to the variation of the absolute optical density of the background of the spot to the extrapolated background before subtraction of this from the absolute optical density values of the scanned line.

6. The method as claimed in claim 5, characterized by deriving said coordinates by sensing the times at which the relative optical density for each scanned line crosses zero and remains positive for a predetermined time ($t_s$) therebetween, said times representing the coordinates of the contour of the part of the spot being scanned.

7. The method as clained in claim 6, characterized in that the density value stored in the memory are first classified to find out to which of the following classes the spot belongs:
   A. absolute optical density exceeding a first predetermined value,
   B. relative optical density smaller than a predetermined second value
   C. relative optical density exceeding the second predetermined value but smaller than the first predetermined value.

8. The method as claimed in claim 5, characterized by the following steps
   i. stopping the further scanning and calculation of this spot if the spot belongs to class A and going to a new well defined area to be investigated
   ii. integrating the relative optical density of the spot within the contour of the next preceding spot classified as belonging to class C if the spot belongs to class B and
   iii. further analyzing the spot if it belongs to class C.

9. The method as claimed in claim 8, characterized in that said further analysis comprises the steps of
   i. ascertaining whether the extension of the spot in the direction of a line exceeds a third predetermined value ($t_s$)
   ii. ascertaining whether the extension of the spot in a direction prependicular to a line exceeds a fourth predetermined value ($b$–$c$)
   iii. ascertaining whether the relative optical density of the spot exceeds a fifth predetermined value (Dix), and if any of these conditions are not fulfilled,
   iiii. stopping the further scanning and calculation of the spot and going to a new well defined area to be investigated and if all of the conditions are fulfilled
   iiiii. integrating the relative optical density of the spot within the contour of the spot.

10. An apparatus for the evaluation of the blackening of spots, particularly weakly blackened spots exposed on photographic film, said apparatus comprising a scanning system including a light beam (9) line-wise scanning a well defined area of a photographic film (7) having said spots exposed thereon an electrical arrangement for converting the transmitted light into an electrical voltage ($D$) representing the optical density values of the scanned lines, an integrating circuit for integrating the optical density values and memory means characterized by first circuit means for deriving the relative optical density of a spot, second circuit means for deriving the boundary points of the contour of a spot, program control means responsive to the absolute as well as relative optical values in order to call in different programs each one controlling the integration of the relative optical density values of a spot in dependence on the boundary points stored in the memory, and integrating means for integrating the relative optical density of said spot.

11. The apparatus as claimed in claim 10, characterized in that said scanning system comprises a light source, a plate illuminated by said light source, an aperture in said plate, a disc rotatably mounted behind said plate and being provided along its periphery with a number of equally spaced, radially extending slots, said slots during rotation of said disc in cooperation with said aperture defining a generally rectangular light beam having a constant cross sectional area, a lens and mirror arrangement directing said light beam onto a surface to be scanned by the light beam, and a photomultiplier picking up the radiation transmitted through said illuminated surface.

12. The apparatus as claimed in claim 11, characterized by a non-linear circuit modifying said photomultiplier signal for compensating any variations in the sensitivity of the scanning system in any desired number of points along the path travelled by the light beam during a sweep.

* * * * *